United States Patent
Park (10) Patent No.: US 7,011,446 B2
(45) Date of Patent: Mar. 14, 2006

(54) THERMOCOUPLE JUNCTION BOX WITH ISOLATED STUDS

(75) Inventor: Sun Park, Woburn, MA (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 10/629,186

(22) Filed: Jul. 29, 2003

(65) Prior Publication Data
US 2005/0025216 A1    Feb. 3, 2005

(51) Int. Cl.
G01K 7/06    (2006.01)
H01L 35/04    (2006.01)

(52) U.S. Cl. ............ 374/208; 374/179; 136/230
(58) Field of Classification Search ......... 374/179, 374/208, 183, 141, 163, 180; 136/230–233, 136/236.1, 237, 200
See application file for complete search history.

(56) References Cited

U.S. PATENT DOCUMENTS

| | | | | |
|---|---|---|---|---|
| 2,410,098 A | * | 10/1946 | Muller | 439/559 |
| 2,483,350 A | * | 9/1949 | Polye et al. | 136/233 |
| 2,611,791 A | * | 9/1952 | Brandau | 136/235 |
| 2,648,983 A | * | 8/1953 | Lamb | 374/179 |
| 2,820,839 A | * | 1/1958 | Schunke | 136/231 |
| 2,836,640 A | * | 5/1958 | Mueller | 136/228 |
| 2,898,933 A | * | 8/1959 | Bancroft | 137/392 |
| 2,971,998 A | * | 2/1961 | Thomas | 136/235 |
| 2,992,402 A | * | 7/1961 | Thomas | 439/712 |
| 3,022,362 A | * | 2/1962 | O'Brien | 136/235 |
| 3,022,669 A | * | 2/1962 | O'Brien | 374/135 |
| 3,309,237 A | * | 3/1967 | Kelchner et al. | 136/221 |
| 3,396,359 A | * | 8/1968 | Melanson | 439/224 |
| 3,405,225 A | * | 10/1968 | McHugh, Jr. | 174/52.1 |
| 3,584,510 A | * | 6/1971 | Harris | 374/179 |
| 3,764,395 A | * | 10/1973 | Boyle | 136/234 |
| 4,088,509 A | * | 5/1978 | Blaze, Jr. | 136/235 |
| 4,162,929 A | * | 7/1979 | Finney | 136/233 |
| 4,202,242 A | * | 5/1980 | Champoux et al. | 411/361 |
| 4,337,221 A | | 6/1982 | Gray | 264/102 |
| 4,354,725 A | * | 10/1982 | Herbaugh et al. | 439/736 |
| 4,385,197 A | * | 5/1983 | Schwagerman | 136/221 |
| 4,410,756 A | * | 10/1983 | Schwagerman | 136/221 |
| 4,460,225 A | * | 7/1984 | Moore et al. | 439/502 |
| 4,624,582 A | | 11/1986 | Banda et al. | 374/181 |
| 4,698,454 A | * | 10/1987 | Moore | 136/233 |

(Continued)

Primary Examiner—Gail Verbitsky
(74) Attorney, Agent, or Firm—Hayes Soloway P.C.

(57) ABSTRACT

A thermocouple junction box for reducing EMF generated by a stud-and-cup configuration comprises a cup adapted to be electrically connected to a thermocouple sensing junction and a stud disposed, at least in part, within the cup, the stud being electrically isolated from the cup. In another aspect, a thermocouple junction box comprises a contact element adapted to be electrically connected to a thermocouple sensing junction and a stud mechanically coupled to the contact element by means of an insulating material and electrically isolated from the contact element by means of the insulating material. In a further aspect, a thermocouple assembly comprises a thermocouple sensing junction, a contact element, and a stud. The stud is adapted to receive thereon a conductive element electrically connected to a thermocouple cable, the stud being electrically isolated from and mechanically coupled to the contact element. The thermocouple cable is coupled to the thermocouple sensing junction via an interface between the conductive element and the contact element when the conductive element is disposed about the stud and seated on the contact element. In still another aspect, a method of reducing thermocouple error consistent with the invention comprises: in a thermocouple junction box having a stud fixedly disposed in relation to a contact element, electrically isolating the stud from the contact element.

36 Claims, 4 Drawing Sheets

U.S. PATENT DOCUMENTS 4,776,706 A * 10/1988 Loiterman et al. .......... 374/208
4,830,515 A *  5/1989 Cortes ........................ 374/208
4,984,904 A *  1/1991 Nakano et al. ............. 374/139
5,167,519 A * 12/1992 Jones et al. ................. 439/259
5,242,226 A *  9/1993 Ross et al. .................. 374/208
5,742,489 A *  4/1998 Riesland ..................... 361/836

* cited by examiner

THERMOCOUPLE JUNCTION BOX WITH ISOLATED STUDS

BACKGROUND OF THE INVENTION

The present invention relates generally to thermocouples, and more particularly, to thermocouple junction boxes for high-temperature environments.

Accurate temperature measurement is often a challenge for instrument engineers, due, in part, to advanced technologies requiring more and more accurate temperature measurements. Traditionally, when high accuracy in temperature readings are important, resistance temperature detectors (RTDs) are often chosen over thermocouples for temperature sensing. However, RTDs offer a limited temperature range and are much more sensitive to vibration and mechanical shock. Thus, there are circumstances where the thermocouple is the only possible choice for temperature measurements. However, as accuracy requirements become more important, it is increasingly important that care is taken in the design and maintenance of thermocouple circuits to assure the most accurate sensing possible.

Thermocouples by nature have inherent problems. First of all, the inaccuracies of thermocouples, due to variables in the alloys of metals used in manufacturing, are considerable with most calibrations. Secondly, many thermocouples have extension wires between the thermocouple sensor and the instrumentation used for indication or control. This adds additional error to the circuit. Also, once the thermocouple signal reaches the measuring instrument, the signal requires a stable, known reference junction. Further, thermocouples are subject to secondary junctions and ground loops, as well as electrical noise.

One of the major sources of error in thermocouple circuits are secondary junctions. Secondary junctions may be formed at connection points in the thermocouple extension wire, bends or kinks in the wire, or abrasions in fiberglass or ceramic fiber wire insulators that expose the thermocouple conductors.

Several methods have been employed in the prior art to limit the amount of error introduced into thermocouple readings by secondary junctions. These solutions have focused on minimizing the number of connection points in the thermocouple extension wire, using one run or length of wire to avoid terminal blocks and connectors, ensuring that the thermocouple extension wire makes no sharp bends and is free of kinks that may cause a short which would result in a secondary junction, and avoiding abrasion of the fiberglass or ceramic insulators, which exposes the conductors. When connections are necessary, a known prior art method of minimizing error involves matching the alloys of the connector or terminal block to the alloy of the thermocouple. Another prior art error reduction method is to ensure that any connection in the circuit is made in an area of relatively constant temperature to avoid temperature gradients across connection points.

Figure 3:
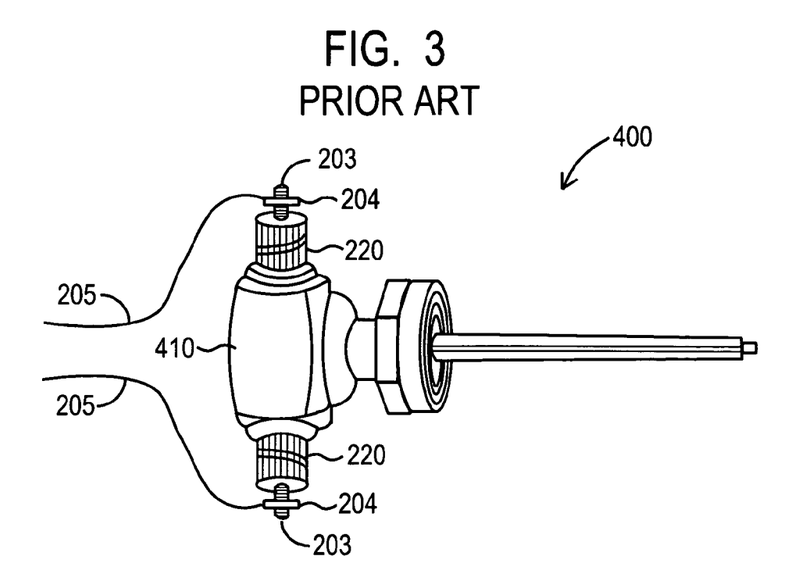
FIG. 3 is a is a side elevational view of a prior art thermocouple.
Figure 4:
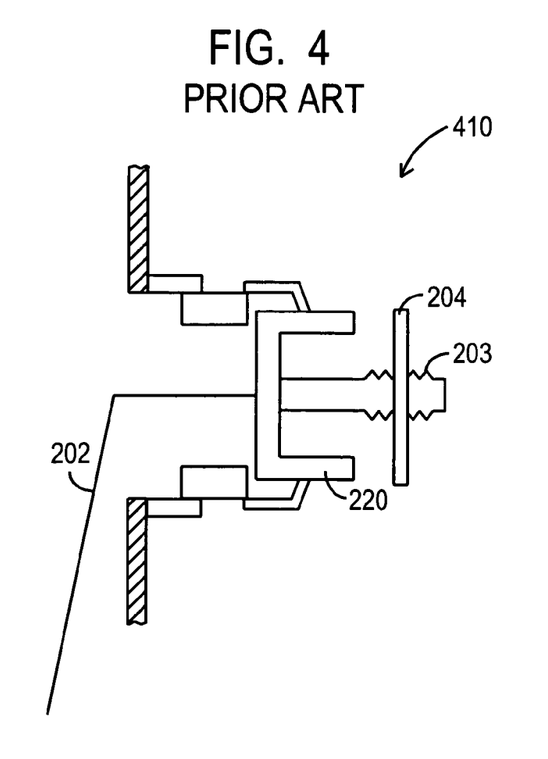
FIG. 4 is a side partial cross-sectional view of a portion of the junction box of the prior art thermocouple of FIG. 3.
Figure 5:
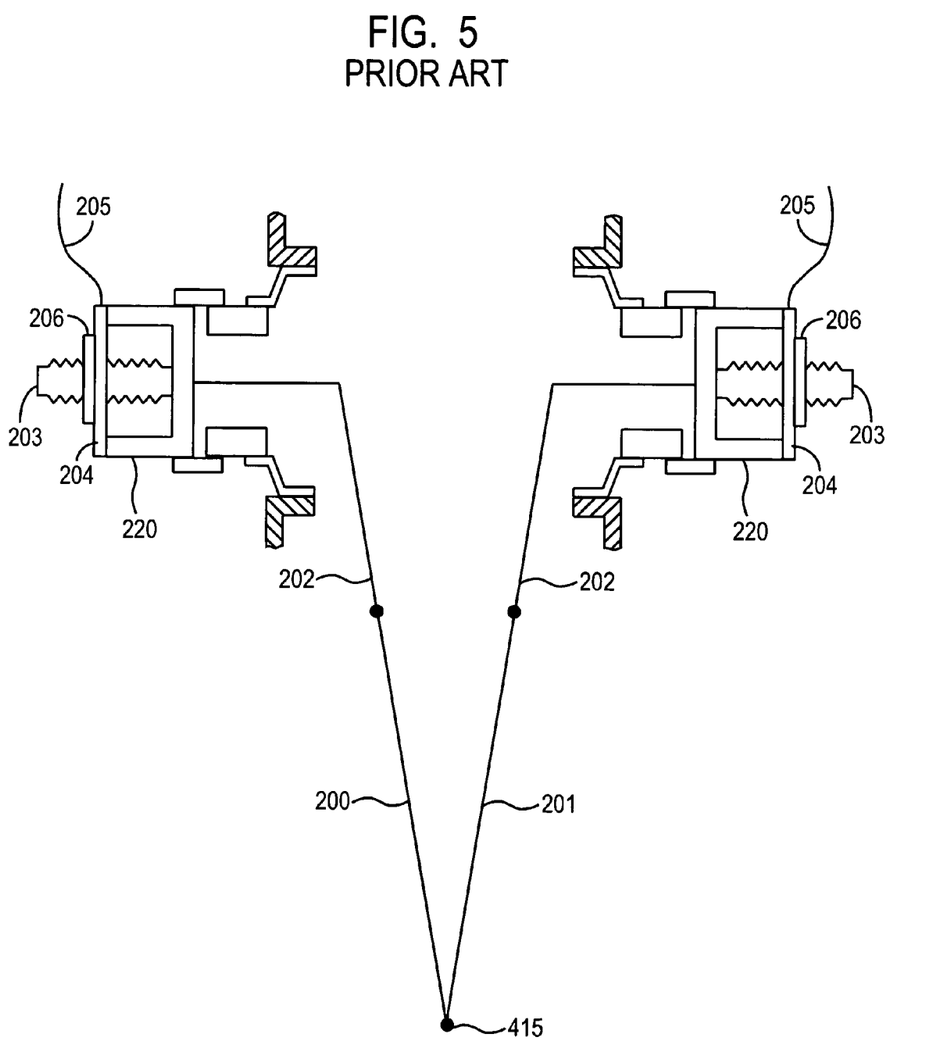
FIG. 5 is another partial cross-sectional view of the thermocouple of FIG. 3.
Figure 6:
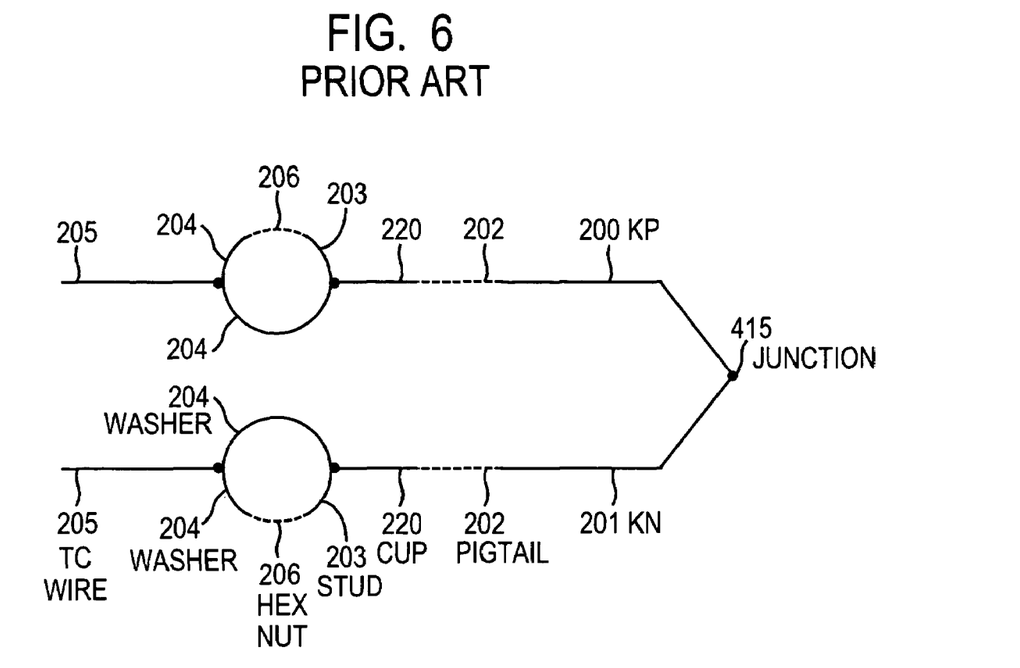
FIG. 6 is a connection diagram of the prior art thermocouple circuit of FIG. 3.
Figure 7:
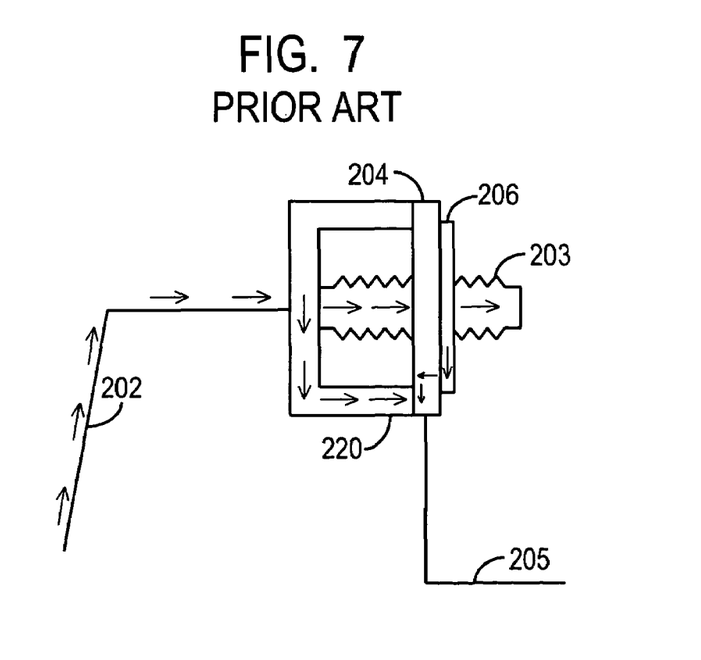
FIG. 7 is a diagram of the current flow through the prior art thermocouple circuit of FIG. 3.

However, the prior art solutions have failed to address the problem of EMF generated by studs when using stud-and-cup components. FIGS. 3, 4 and 5 illustrate a prior art thermocouple 400, including junction box 410 having a typical stud-and-cup configuration. FIGS. 6 and 7 are respectively a wiring diagram and a current flow diagram for the prior art thermocouple. This thermocouple 400 comprises two conductors 200, 201 connected at a primary junction 415, one conductor 200 formed of KP metal, and the other 201 formed of KN metal, each being welded to a pigtail 202. Each pigtail 202 is connected to a type K cup 220, through which a threaded stainless steel stud 203 is disposed and to which the stud 203 is connected. Each stud 203 is adapted to receive a corresponding washer or lug 204 and nut 206 threadably disposed onto the stud 203, for attachment of the pigtail 202 and cup 220 to the thermocouple cable 205 (which is connected to the washer or lug 204). In this prior art thermocouple, the stainless steel stud is capable of generating EMF, thus introducing error into the circuit.

The error created by the above-described prior art configuration was the subject of a recent experiment by the inventor. When the stainless steel studs of several prior art thermocouple junction boxes were exposed to 300° F. blowing air while the tip of the thermocouple was kept at room temperature, an amount of error significantly larger than the error caused by typical secondary junctions, i.e., outside of the typical tolerances, was introduced into the measurement system. It is the belief of the inventor that the stainless steel stud is a major contributor to the overall measurement error in thermocouples that employ such a stud-and-cup design, and improvement of junction box design is needed to improve the accuracy of the thermocouple.

SUMMARY OF THE INVENTION

The present invention provides a thermocouple junction box having a connecting portion, e.g., a stainless steel stud, that is electrically isolated from and fixedly disposed with respect to a contact element, e.g., a type K metal cup, via an insulating material. The stud is for receiving a conductive element, e.g., a washer or lug, that is connected to a thermocouple cable, such that the thermocouple cable electrically connects to a thermocouple junction comprising two different types of metal wires that extend into metal pigtails, each pigtail welded to a respective contact element of the junction box. The conductive element electrically connects to the pigtails using a washer and a nut connected to the stud. The washer contacts the sides of the cup, thereby forming the electrical connection.

In one aspect, a thermocouple junction box consistent with the present invention comprises a cup electrically connected to a thermocouple sensing junction and a stud disposed, at least in part, within the cup, the stud being electrically isolated from the cup. The cup may be connected to the thermocouple sensing junction by a conductor welded to the cup and may comprise type K metal. The stud may be threaded and may comprise stainless steel. The thermocouple junction box may further comprise a conductive element electrically connected to a thermocouple cable and movably disposed along the length of the stud, and the conductive element may be a washer or lug. The conductive element may comprise a non-conductive portion, the non-conductive portion being in contact with the stud when the conductive element is disposed on the stud. The thermocouple junction box may further comprise an insulating element independently movably disposed along the stud with respect to the conductive element, the insulating element electrically isolating the conductive element from the stud. The insulating element may have an annular shape.

In another aspect, a thermocouple junction box consistent with the present invention comprises a contact element electrically connected to a thermocouple sensing junction and a stud mechanically coupled to the contact element by means of an insulating material and electrically isolated from the contact element by means of the insulating material. The stud may be connected to the contact element by means of friction or interference fit with the insulating material or by means of oxide bonding. The stud may be connected to the contact element by means of brazing or welding to the insulating material. The insulating material may have an annular shape. The contact element may comprise type K metal and may be cup-shaped. The stud may comprise stainless steel and may be threaded. The contact element may be connected to the thermocouple sensing junction by a conductor welded to the contact element. The thermocouple junction box may further comprise a conductive element electrically connected to a thermocouple cable and movably disposed along the length of the stud. The conductive element may be a washer or lug. The conductive element may comprise a non-conductive portion, the non-conductive portion being in contact with the stud when the conductive element is disposed on the stud. The thermocouple junction box may further comprise an insulating element independently movably disposed along the stud with respect to the conductive element, the insulating element electrically isolating the conductive element from the stud. The insulating element may have an annular shape.

In a further aspect, a thermocouple assembly consistent with the present invention comprises a thermocouple sensing junction, a contact element, and a stud. The stud is adapted to receive thereon a conductive element electrically connected to a thermocouple cable, the stud being electrically isolated from and mechanically coupled to the contact element. The thermocouple cable is coupled to the thermocouple sensing junction via an interface between the conductive element and the contact element when the conductive element is disposed about the stud and seated on the contact element.

In still another aspect, a method of reducing thermocouple error consistent with the invention comprises: in a thermocouple junction box having a stud fixedly disposed in relation to a contact element, electrically isolating the stud from the contact element. The stud and the contact element may be formed from different metals. The contact element may be cup-shaped. The stud may be disposed, at least in part, in the cup-shaped contact element.

In yet another aspect, a thermocouple assembly consistent with the present invention comprises a thermocouple sensing junction and a connecting portion for positioning a thermocouple cable such that it electrically connects to said thermocouple sensing junction. The thermocouple sensing junction and said thermocouple cable are electrically isolated from said connecting portion.

BRIEF DESCRIPTION OF THE DRAWINGS

For a better understanding of the present invention, together with other objects, features and advantages, reference should be made to the following description of the embodiments which should be read in conjunction with the following figures wherein like numerals represent like parts.

DETAILED DESCRIPTION OF THE EMBODIMENTS

As explained above and shown in FIGS. 3 through 7, a prior art thermocouple comprises a sensing junction 415 of two different metal wires 200, 201, which extend into pigtails 202. Inside the junction box 410, each pigtail 202 is connected to a cup (or other contact element) 220, through which a threaded stud (or other connecting portion) 203 is disposed and to which the stud 203 is connected, e.g., by brazing or welding. Each stud 203 is adapted to receive a corresponding washer or lug (or other conductive element) 204 and nut 206 threadably disposed onto the stud 203, for attachment of the pigtail 202 and cup 220 to the thermocouple cable 205. In the typical thermocouple, the stud 203 and the pigtail 202 are both connected to cup 220, thereby creating a path for EMF generated by the studs of the junction box 410.

Figure 1:
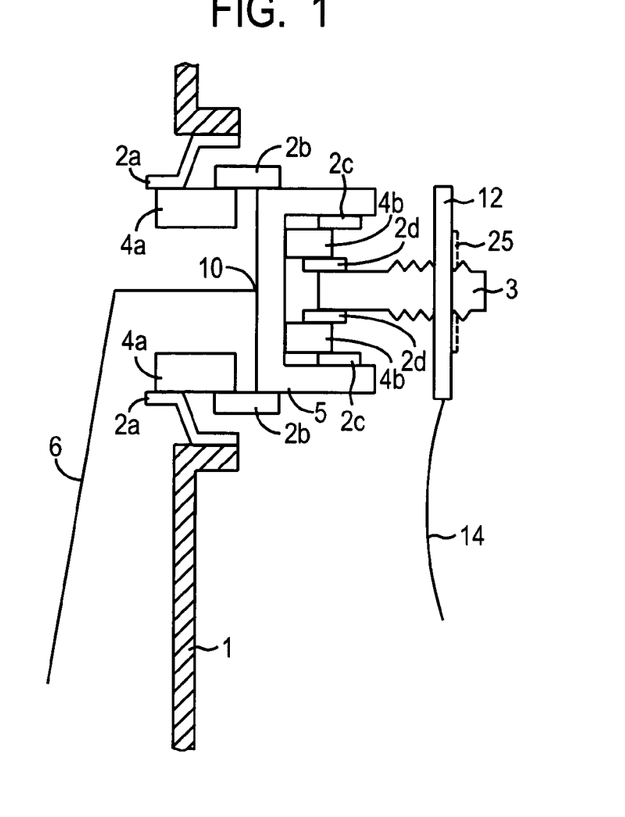
FIG. 1 is a side partial cross-sectional view of a portion of the thermocouple junction box according to an embodiment of the instant invention.

However, in the present invention, as shown in FIG. 1, the stud (or other connecting portion) 3 is electrically isolated from the cup (or other contact element) 5 via an insulator 4b, e.g., a ceramic insulator. The metal stud 3 is supported inside the cup 5 by providing a first metal (e.g., Ni) sleeve 2d in contact with the stud 3, and the first sleeve 2d also in contact with an insulating sleeve 4b (e.g., ceramic), which is in contact with a second metal (e.g., Ni) sleeve 2c. The second metal sleeve 2c is in contact with the cup 5. The cup 5 is attached to the junction box shell 1 by providing a third metal sleeve 2b in contact with another ceramic insulating sleeve 4a which contacts a fourth metal sleeve 2a, which may comprise portions having varying diameters. The fourth metal sleeve 2a is in contact with the junction box shell 1. Since the stud 3 is connected to the cup 5 only through sleeves 2d and 2c and insulating sleeve 4b, the stud does not directly contact the cup 5. Thus, the stud 3 is electrically isolated from the cup 5. It should be noted that the foregoing interfaces between components (e.g., between sleeve 2d and stud 3; between sleeves 2d and 4b; between fourth sleeve 2a and shell 1; etc.) may be achieved by, e.g., oxide bonding, friction and/or interference fit, the use of adhesives, or other methods, e.g., metal sleeve 2c may be welded or brazed to the cup 5.

Figure 2:
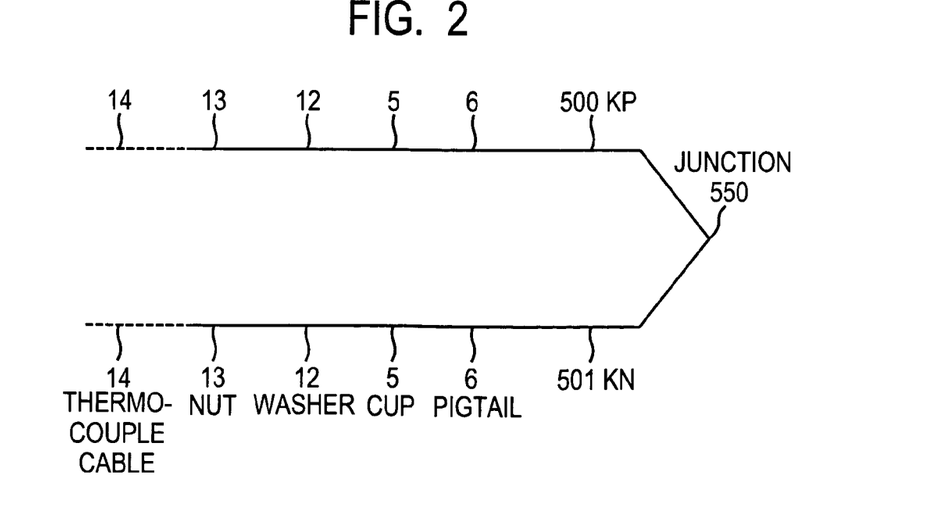
FIG. 2 is a connection diagram of the thermocouple circuit of FIG. 1.

Next, the connection of the pigtails 6 to the thermocouple cable 14 will be described. With reference to FIG. 2, in the instant invention, two conductors 500, 501 connected at a sensing junction 550, one conductor 500 formed of KP metal, and the other 501 formed of KN metal, each being welded to a pigtail 6. Each pigtail 6 is connected to a cup 5 and is electrically connected to the threaded stud 3 when a washer or lug (or other conductive element) 12 is disposed on the stud 3 so as to contact the cup 5. Each pigtail 6 contacts a cup 5 at a junction 10. The thermocouple cable 14, which is attached to washer or lug 12, is connected to the stud 3 using washer or lug 12 and nut 13, such that the washer or lug 12 contacts the cup 5. Thus, the pigtails 6 are electrically connected to the thermocouple cable 14 via the cups 5 in contact with the washers or lugs 12.

In addition to the above-described junction box structure, the stud 3 may be completely electrically isolated from both the cup 5 and the washer or lug 12 by providing an additional washer 25 (not shown) made of insulating material between the washer or lug 12 and nut 13. This may instead be accomplished by using a washer or lug 12 having an aperture formed therein, wherein the aperture is completely covered with an insulating material, or alternatively, wherein the inner diameter of the aperture is larger than the outer diameter of the stud 3, so that no conductive connection is made between the washer or lug 12 and stud 3.

Exemplary materials for the stud, cup, pigtails and sleeve will now be described. In one embodiment, sleeves 2a, 2b, 2c and 2d may comprise nickel. The stud 3 may comprise stainless steel, and the cup 5 and pigtail 6 may comprise type K metal. The insulating sleeves 4a, 4b may comprise ceramic or another insulator. Further, while the use of washers and nuts disposed on the studs is disclosed above for connecting the thermocouple cable to the thermocouple junction via the cup, it should be recognized that other similarly functioning elements may be employed, e.g., a lug, a conductive plate, a clamp, a spade, a spacer, or other such elements.

It should also be recognized that references to "cups" and "studs" herein should not be construed as limiting the invention, e.g., to cup-shaped or elongate threaded elements, respectively, and it should be understood that these elements may take a variety of forms. For example, the stud could instead be a non-threaded connecting portion having any suitable form to serve the purpose of positioning the thermocouple cable such that it electrically connects to the thermocouple sensing junction, with the connecting portion itself being isolated from both the thermocouple cable and the thermocouple sensing junction. Likewise, the cup could be a contact element having any suitable form to serve the purpose of connecting the thermocouple sensing junction to the thermocouple cable.

Thus, there has been provided a thermocouple junction box that reduces EMF error introduced by its studs, thereby providing improved reliability and performance, as detailed above. Those skilled in the art will recognize numerous modifications to the present invention, and all such modifications are deemed within the scope of the present invention, only as limited by the claims.

What is claimed is:

1. A thermocouple junction box comprising:
   a metallic cup electrically connected to a thermocouple sensing junction;
   a stud disposed, at least in part, within said cup, said stud being electrically isolated from said cup, and
   a conductive element electrically connected to a thermocouple cable and movably disposed along the length of said stud,
   wherein said conductive element is a washer or lug, and
   wherein said conductive element comprises a non-conductive portion, said non-conductive portion being in contact with said stud when said conductive element is disposed on said stud.

2. A thermocouple junction box as claimed in claim 1, wherein said cup is electrically connected to a thermocouple sensing junction.

3. A thermocouple junction box as claimed in claim 1, wherein said stud is threaded.

4. A thermocouple junction box as claimed in claim 1, wherein said cup comprises type K metal.

5. A thermocouple junction box as claimed in claim 1, wherein said stud comprises stainless steel.

6. A thermocouple junction box-comprising:
   a metallic cup electrically connected to a thermocouple sensing junction;
   a stud disposed, at least in part, within said cup, said stud being electrically isolated from said cup, and
   a conductive element electrically connected to a thermocouple cable and movably disposed along the length of said stud, wherein said conductive element comprises a non-conductive portion, said non-conductive portion being in contact with said stud when said conductive element is disposed on said stud, and
   an insulating element independently movably disposed along said stud with respect to said conductive element, said insulating element electrically isolating said conductive element from said stud,
   wherein said conductive element is a washer or lug.

7. A thermocouple junction box as claimed in claim 6, wherein said cup is electrically connected to a thermocouple sensing junction.

8. A thermocouple junction box as claimed in claim 6, wherein said stud is threaded.

9. A thermocouple junction box as claimed in claim 6, wherein said cup comprises type K metal.

10. A thermocouple junction box as claimed in claim 6, wherein said stud comprises stainless steel.

11. A thermocouple junction box comprising:
    a metallic contact element electrically connected to a thermocouple sensing junction;
    a stud mechanically coupled to said contact element by means of an insulating material and electrically isolated from said contact element by means of said insulating material,
    a conductive element electrically connected to a thermocouple cable and movably disposed along the length of said stud,
    wherein said conductive element comprises a non-conductive portion, said non-conductive portion being in contact with said stud when said conductive element is disposed on said stud.

12. A thermocouple junction box as claimed in claim 11, wherein said stud is connected to said contact element by means of friction or interference fit with said insulating material or by means of oxide bonding.

13. A thermocouple junction box as claimed in claim 11, wherein said stud is connected to said contact element by means of brazing or welding to said insulating material.

14. A thermocouple junction box as claimed in claim 11, wherein said insulating material has an annular shape.

15. A thermocouple junction box as claimed in claim 11, wherein said contact element comprises type K metal.

16. A thermocouple junction box as claimed in claim 11, wherein said stud comprises stainless steel.

17. A thermocouple junction box as claimed in claim 11, wherein said contact element is cup-shaped.

18. A thermocouple junction box as claimed in claim 11, wherein said contact element is connected to a thermocouple sensing junction.

19. A thermocouple junction box as claimed in claim 11, wherein said stud is threaded.

20. A thermocouple junction box comprising:
    a metallic contact element electrically connected to a thermocouple sensing junction,
    a stud mechanically coupled to said contact element by means of an insulating material and electrically isolated from said contact element by means of said insulating material,
    a conductive element electrically connected to a thermocouple cable and movably disposed along the length of said stud, wherein said conductive element comprises a non-conductive portion, said non-conductive portion being in contact with said stud when said conductive element is disposed on said stud, and an insulating element independently movably disposed along said stud with respect to said conductive element, said insulating element electrically isolating said conductive element from said stud.

21. A thermocouple junction box as claimed in claim 20, wherein said stud is connected to said contact element by means of friction or interference fit with said insulating material or by means of oxide bonding.

22. A thermocouple junction box as claimed in claim 20, wherein said stud is connected to said contact element by means of brazing or welding to said insulating material.

23. A thermocouple junction box as claimed in claim 20, wherein said insulating material has an annular shape.

24. A thermocouple junction box as claimed in claim 20, wherein said contact element comprises type K metal.

25. A thermocouple junction box as claimed in claim 20, wherein said stud comprises stainless steel.

26. A thermocouple junction box as claimed in claim 20, wherein said contact element is cup-shaped.

27. A thermocouple junction box as claimed in claim 20, wherein said contact element is connected to a thermocouple sensing junction.

28. A thermocouple junction box as claimed in claim 20, wherein said stud is threaded.

29. A thermocouple junction box comprising:
   a metallic contact element electrically connected to a thermocouple sensing junction;
   a stud mechanically coupled to said contact element by means of an insulating material and electrically isolated from said contact element by means of said insulating material, and
   a conductive element electrically connected to a thermocouple cable and movably disposed along the length of said stud, wherein said conductive element comprises a non-conductive portion, said non-conductive portion being in contact with said stud when said conductive element is disposed on said stud, and
   wherein said insulating element has an annular shape.

30. A thermocouple junction box as claimed in claim 25, wherein said stud is connected to said contact element by means of friction or interference fit with said insulating material or by means of oxide bonding.

31. A thermocouple junction box as claimed in claim 25, wherein said stud is connected to said contact element by means of brazing or welding to said insulating material.

32. A thermocouple junction box as claimed in claim 25, wherein said contact element comprises type K metal.

33. A thermocouple junction box as claimed in claim 25, wherein said stud comprises stainless steel.

34. A thermocouple junction box as claimed in claim 25, wherein said contact element is cup-shaped.

35. A thermocouple junction box as claimed in claim 25, wherein said contact element is connected to a thermocouple sensing junction.

36. A thermocouple junction box as claimed in claim 25, wherein said stud is threaded.

* * * * *

UNITED STATES PATENT AND TRADEMARK OFFICE
CERTIFICATE OF CORRECTION

PATENT NO. : 7,011,446 B2 Page 1 of 1
APPLICATION NO. : 10/629186
DATED : March 14, 2006
INVENTOR(S) : Park It is certified that error appears in the above-identified patent and that said Letters Patent is hereby corrected as shown below:

Column 8, Line 9, "as claimed in claim 25" should be --as claimed in claim 29--.
Column 8, Line14, "as claimed in claim 25" should be --as claimed in claim 29--.
Column 8, Line 18, "as claimed in claim 25" should be --as claimed in claim 29--.
Column 8, Line 20, "as claimed in claim 25" should be --as claimed in claim 29--.
Column 8, Line 22, "as claimed in claim 25" should be --as claimed in claim 29--.
Column 8, Line 24, "as claimed in claim 25" should be --as claimed in claim 29--.
Column 8, Line 28, "as claimed in claim 25" should be --as claimed in claim 29--.

Signed and Sealed this

Fifteenth Day of August, 2006

JON W. DUDAS
*Director of the United States Patent and Trademark Office*